United States Patent [19]

Verlaan et al.

[11] Patent Number: 4,808,442
[45] Date of Patent: Feb. 28, 1989

[54] COMPOSITION SUITABLE FOR USE IN POLYMER CROSS-LINKING PROCESSES

[75] Inventors: Johannes P. J. Verlaan, Deventer; Leonardus B. G. M. Nijhoe, Enter, both of Netherlands

[73] Assignee: Akzo NV, Arnhem, Netherlands

[21] Appl. No.: 947,857

[22] Filed: Dec. 30, 1986

[30] Foreign Application Priority Data

Jan. 23, 1986 [NL] Netherlands ............... 8600140

[51] Int. Cl.⁴ ............... C08J 3/24; B32B 25/02
[52] U.S. Cl. ............... 427/393.5; 427/388.2; 523/221; 428/517; 524/445
[58] Field of Search ............... 524/445; 523/221; 427/393.5, 388.2; 428/517

[56] References Cited

U.S. PATENT DOCUMENTS

| | | | |
|---|---|---|---|
| Re. 32,028 | 11/1985 | Fischer | 525/194 |
| 3,449,191 | 6/1969 | Taylor . | |
| 3,528,841 | 9/1970 | Donaldson et al. | 427/393.5 |
| 4,058,647 | 11/1977 | Inoue et al. | 428/480 |
| 4,059,654 | 11/1977 | Von Bodungen et al. | 524/525 |
| 4,071,494 | 1/1978 | Gaylord | 525/193 |
| 4,082,862 | 4/1978 | Esemplare et al. | 427/393.5 |
| 4,087,485 | 5/1978 | Huff | 525/192 |
| 4,088,714 | 5/1978 | Huff | 525/194 |
| 4,136,105 | 1/1979 | Sanchez | 525/27 |
| 4,143,099 | 3/1979 | Duncan | 525/350 |
| 4,235,835 | 11/1980 | Stutzman et al. | 524/445 |
| 4,317,765 | 3/1982 | Gaylord | 524/531 |
| 4,334,043 | 6/1982 | Groepper . | |
| 4,439,388 | 3/1984 | Groepper . | |
| 4,530,971 | 7/1985 | Geri et al. | 525/194 |
| 4,636,528 | 1/1987 | Kamens et al. | 521/128 |
| 4,650,830 | 3/1987 | Yonekura | 525/194 |
| 4,684,672 | 8/1987 | Buchanan et al. | 525/194 |

FOREIGN PATENT DOCUMENTS

| | | | |
|---|---|---|---|
| 1199463 | 1/1986 | Canada . | |
| 0025591 | 3/1981 | European Pat. Off. . | |
| 99640 | 2/1984 | European Pat. Off. | 427/388.2 |
| 0025720 | 2/1981 | Japan . | |
| 140159 | 8/1982 | Japan . | |
| 3435 | 1/1984 | Japan | 427/393.5 |
| 378039 | 7/1964 | Switzerland . | |

*Primary Examiner*—Herbert J. Lilling
*Attorney, Agent, or Firm*—Parkhurst, Oliff & Berridge

[57] ABSTRACT

A composition is disclosed which is especially suitable for use in the pretreatment of polymers that have to be cross-linked with a radical forming cross-linking agent. The resulting shaped, cross-linked products display excellent surface properties. The composition contains a finely divided, film forming polymer, e.g. polyethylene, a finely divided rubber filler, e.g. silanized clay, and an organic peroxide, e.g. dicumyl peroxide.

7 Claims, No Drawings

COMPOSITION SUITABLE FOR USE IN POLYMER CROSS-LINKING PROCESSES

The invention relates to a composition which is particularly suitable for use in processes for cross-linking polymers, and to a cross-linking process in which this composition is applied.

Such a composition and such a process are known from European Patent Application No. 0,025,591 A1. As described in said publication, polymers are cross-linked with sulphur or radical forming compounds, such as organic peroxides, and it is known that cross-linking with radical forming compounds if carried out in the presence of (i.e. not barring) oxygen, will lead to end products with a sticky surface. Although such stickiness does not manifest itself when vulcanization is done with sulphur, the properties of the products obtained by using radical forming cross-linking agents are such that the use of the last-mentioned cross-linking agents is very often preferred. In view thereof it has already been proposed that crosslinking reactions be carried out in closed systems, such as in fusible salt baths (liquid curing method) and steam vulcanization equipment. However, the envisaged barring of oxygen in such systems is not nearly always achieved to a sufficient extent. In the above Patent Application it is proposed that this problem be solved by subjecting the mixture of polymer, radical forming cross-linking agent and optional additives before or after the shaping process, but before cross-linking in the presence of oxygen, to a treatment with:

(A) a metal organic compound of a transition element, except vanadium;
(B) an inorganic salt of one of the transition elements referred to under A);
(C) a lanthanide compound; or
(D) a mixture thereof.

To this method, however, there are several drawbacks. In the first place it has been found that particularly with polymers having a high extender oil content the surfaces thus obtained still display considerable stickiness. In the second place it has been found that of the products obtained the material immediately below the surface is not at all sufficiently crosslinked. In the third place many of the compounds proposed, i.e. those that contain transition metal ions, are hazardous from a toxic point of view.

The invention has for its object to meet all these drawbacks. To this end it provides a composition containing separately (a) a solid, finely divided, film forming polymer,
(b) a finely divided rubber filler, and
(c) an organic peroxide having a half-life period of decomposition of at least 15 minutes at 100° C., the amounts of a, b and c being 5–75% by weight, 5–75% by weight and 5–70% by weight, respectively, calculated on the amount of (a+b+c).

It should be added that from Japanese Patent Application No. 25720/1981 it is known to provide the surface of a rubber product with a closely fitting and adhering polyolefin film by applying a powdered polyolefin to the surface of a peroxide-containing, unvulcanized rubber and subsequently carrying out a heating step. Essential is that the polyolefin powder used should contain a lubricant, such as graphite, molybdenum sulphide, mica or polytetrafluoroethylene and the heating is carried out by compression moulding. From this last-mentioned step it appears that the cross-linking was effected with oxygen being barred (a so-called closed system, see above). Further, no mention is made of adding a peroxide to the polyolefin powder. The present invention, therefore, is neither known from this publication, nor can be derived from it. In this connection it should be noted that the advantages offered by the composition according to the present invention when used in cross-linking processes can no longer be obtained if said composition is used in an amount such as permits the formation of a closely fitting and adhering film. Such an additional layer would lead to cross-linked end products which are different from those envisaged by the present invention, the latter having no such additional layer.

It should further be added that from U.S. Pat. No. 3,449,191 it is known to provide metals, olefin polymers and halogenated olefin polymers with an ablative coating comprising the cured product of (a) int. al. polyethylene, (b) 2,5-bis(tert.butylperoxy)-2,5-dimethylhexane or 2,5-bis(tert.butylperoxy)-2,5-dimethylhexyne-3 and (c) a filler material. As disclosed, the process starts with blending the peroxide and filler into fluxing polyethylene (at 138°–149° C.). When the mixture is cooled to room temperature it may be applied in the form of plates, thin sheets or powder to other objects that are subsequently heated above the decomposition point of the peroxide. This reference, however, makes no allusion to the present invention for the following reasons.

Firstly, the method of powder preparation as taught in this reference requires a blending step at elevated temperature, whereas in the composition according to the present invention the essential components are contained separately, thus obviating a blending step at elevated temperature and avoiding any risk of premature peroxide decomposition. Secondly, the objects (substrates) which are to be provided with an ablative coating according to this reference cannot be compared with the substrates of the present invention, the latter being polymers that have to be cross-linked. Finally, the cross-linked products envisaged by the present invention are not provided with a coating, as explained above.

It should also be added that Swiss Patent Specification No. 378,039 discloses homogeneously mixing high-pressure polyethylene with acid carbon black and an organic peroxide, such as dicumyl peroxide, at a temperature of about 110° C., after which the mixture is cooled and subjected to diminution. This reference, however, is not suggestive of the composition of the present invention, if for no other reason than the requirement of mixing the components at elevated temperature, as explained above.

Both homopolymer and copolymer are hereinafter referred to as polymer.

Composition

As suitable examples of the film forming polymers (component a) that may be used in the present composition may be mentioned polyolefinic polymers, such as polyethylene, of the high, medium, or low density type, and polypropylene, polystyrene, copolymers of ethylene and a monomer selected from the group of propylene, 1-butene and vinyl acetate and copolymers of acrylonitrile, butadiene and styrene. Use also may be made of combinations of polymers. It is preferred that polyethylene should be used.

The particle size of the polymer is generally in the range of 1 to 100 microns, preferably 5 to 50 microns. Favourable results are obtained with polymers having a melt flow index in the range of 20 to 500 g/10 min., preferably, 50 to 100 g/10 min., measured at 190° C. and at a pressure of 2.16 kg, in accordance with ASTM 1238.

Examples of suitable rubber fillers (component b) include pretreated or non-pretreated clays, silicas, silicates, talc and calcium carbonate, metal oxides, graphite, furnace black and acetylene black. Use also may be made of combinations of rubber fillers. The particle size is generally in the range of 1 to 100 microns, preferably 5 to 50 microns. It is preferred that use should be made of mineral fillers, more particularly clays and/or silicas. It has been found that particularly favourable results are obtained with calcinated clays and/or silicas subjected or not to a surface treatment in the form of a silanization.

The peroxide to be used in the composition (component c) should, as indicated above, have a half-life period of decomposition of at least 15 at 100° C. The half-life period then is measured on an 0.2 molar solution of the peroxide in chlorobenzene. As examples of suitable peroxides may be mentioned di-t-butyl peroxide, t-butyl cumyl peroxide, bis(t-butylperoxyisopropyl)benzene, dicumyl peroxide, 4,4-di(t-butylperoxy)-n-butylvalerate, 2,5-di(t-butylperoxy)-2,5-dimethylhexane, 2,5-di(t-butylperoxy)-2,5-dimethylhexyne-3, 1-(t-butylperoxyisopropyl)-3-isopropenylbenzene, 1,1-di(t-butylperoxy)-3,3,5-trimethylcyclohexane, t-butylperoxybenzoate, dibenzoyl peroxide, bis(p-chlorobenzoyl)peroxide, bis(2,4-dichlorobenzoyl)peroxide and 0,0-t-butyl O-stearyl monoperoxycarbonate. Also combinations of peroxides may be used.

As indicated above, the amounts of the components a, b and c in the present composition are 5–75% by weight, 5–75% by weight and 5–70% by weight, respectively, calculated on the amount of (a+b+c). It is preferred that these amounts should be 25–40% by weight, 10–40% by weight and 30–55% by weight, respectively, more particularly 28–38% by weight, 17–27% by weight and 39–49% by weight, respectively.

As noted above, the particle size of both the polymer and the filler is generally in the range of 1 to 100 microns. For, if the particle size exceeds 100 microns, the composition can be less successfully used in the cross-linking processes as described below because of the resulting irregular surface of the shaped end products.

Additives

In addition to the above-described components a, b and c the composition may with advantage contain a so-called co-agent as used in the peroxidic cross-linking of polymers. As examples of suitable co-agents may be mentioned triallyl cyanurate, triallyl isocyanurate, triallyl phosphate, ethylene glycol dimethacrylate, trimethylolpropane trimethacrylate, divinyl benzene, diallyl maleinate and N,N'-m-phenylene dimaleimide. It is preferred that use should be made of N,N'-m-phenylene dimaleimide. The co-agent is generally used in an amount in the range of 0 to 500% by weight, preferably 25 to 200% by weight, calculated on the amount of peroxide (component c). Other additives that qualify for incorporation into the composition are antidegradants (i.e. antioxidants and antiozonants), UV-stabilizers, pigments and biocides as commonly used in the rubber processing industry, their nature and amounts being so chosen that the effect envisaged with them is attained. For illustration reference is made in this connection to suitable antidegradants such as the well-known compounds selected from the classes of the thiobisphenols, alkylidene bisphenols, alkyl phenols, hydroxybenzyl compounds, acylamino phenols, hydroxyphenyl propionates, secondary aromatic amines, thioethers, phosphites, phosphonites and heterocyclic compounds and to suitable UV-stabilizers such as the well-known compounds selected from the classes of the hydroxyphenyl benzotriazoles, aromatic acid esters and 2-hydroxybenzophenones. As examples of suitable pigments may be mentioned titanium dioxide, iron oxide and organic azo dyes, such as those commonly used in the polymer processing industry.

Form of the Composition

The form of the composition may be varied with the way in which it is to be applied (see below).

In the first place the components a, b and c and any desired additives may be intermixed as such. In that case, if all the ingredients are solid substances which are in a finely divided state, a powdered appearance is obtained; if one or more ingredients are liquid, however, use of a sufficient amount thereof may result in obtaining a paste.

Alternatively, the components a, b and c along with optional additives may be added to a solvent. In that case use of little solvent will likewise result in obtaining a pasty composition. Use of a larger amount of solvent will lead to a liquid formulation in which the solid ingredients, such as the components a and b, are present in the suspended state. Examples of suitable solvents include water, ethanol, acetone and xylene. Partly for reasons of safety it is preferred that use should be made of water. As the use of water-containing compositions may impede the wetting of polymer surfaces, it is recommended that in such compositions an effective amount of a surface active agent be incorporated. A examples of suitable surface active agents may be mentioned alkyl benzene sulphonates, fatty alcohol sulphates, fatty acid soaps, ethoxylated nonyl phenols, ethoxylated fatty alcohols, ethylene oxide/propylene oxide copolymers and polyethylene glycols. Preferred are the nonionic surfactants.

To avoid demixing and/or precipitation in liquid formulations it is recommended that they should also contain stabilizing agents. To this end the aqueous formulations may contain commonly employed thickening agents, such as methyl cellulose, carboxymethyl cellulose, hydroxyethyl cellulose, starch, polyvinyl alcohol, polyacrylates and xanthan gum. A preferred thickening agent is xanthan gum. Besides, it may be of advantage for the aqueous formulations to include foam suppressing agents; extremely effective to this end are silicon oils. The above-described powders, pastes and liquid formulations may be prepared in a simple manner in conventional mixing apparatus, such as colloid mills, propeller stirrers, planetary mixers and powder mixers. In the case where a dilute, liquid formulation is desired it will in actual practice be preferred, because of high transport cost and storage stability, that the composition be transported and/or stored, while in the form of a powder, a paste or a concentrated, liquid formulation and that prior to use the desired end concentration be set by adding the solvent, in combination or not with, for instance, a surfactant and/or a thickener.

Applying the Composition

The invention also relates to a process for cross-linking a polymer with the aid of a radical forming cross-linking agent, in which process a mixture of the polymer, the cross-linking agent and optional additives is prior to the cross-linking reaction subjected to a treatment with a composition according to the invention. Details for carrying out this process are as follows.

First, a mixture is prepared of the polymer, a radical forming cross-linking agent and optional additives.

As examples of polymers may be mentioned ethylene-propylene copolymers (EPM), ethylene-propylene-dienemonomer copolymers (EPDM), examples of dienemonomers being ethylidene norbornene, dicyclopentadiene and 1,4-hexadiene, styrene-butadiene rubber (SBR), acrylonitrile-butadiene rubber (NBR), natural rubber (NR), polyisoprene rubber (IR), ethylene-vinyl acetate copolymers (EVA), acrylonitrile-butadiene-styrene copolymers (ABS), styrene-butadiene-styrene rubber (SBS), styrene-isoprenestyrene copolymers (SIS), polychloroprene rubber (CR), chlorinated polyethylene (CM/CPE), chlorinated sulphonated polyethylene (CSM), polyurethane rubber (AU/EU), high density polyethylene (HDPE), low density polyethylene (LDPE/LLDPE), silicone rubber, polyisobutene and polybutadiene.

As suitable radical forming cross-lining agents known to be used for this purpose may be mentioned organic peroxides, azo compounds and C-C-initiators. Examples of suitable organic peroxides are those described above as component c of the composition according to the invention.

Examples of optional additives are fillers, such as carbon black, metal oxides, clay, pigment and silica, plasticizers, antidegradants, UV-stabilizers, blowing agents, extender oils, such as paraffinic, naphthenic and aromatic oils or mixtures thereof and co-agents, such as triallyl cyanurate, triallyl isocyanurate, triallyl phosphate and trimethylolpropane trimethacrylate.

The mixture of polymer, cross-linking agent and any optional additives [to be referred to hereinafter as polymer mixture] generally contains the cross-linking agent in an amount of 0.5–15% by weight, preferably 1–10% by weight, calculated on the total weight of the mixture. The other additives may be present in the polymer mixture in amounts usual for such additives.

Following the preparation of the polymer mixture in the usual mixing apparatus and the shaping thereof by appropriate techniques, such as blowing, extruding or moulding, comes the treatment with the composition according to the invention, i.e. applying the composition according to the invention to the surface of the shaped polymer mixture. To this end use may be made of commonly employed techniques, such as powder application methods, application by brush [brushing], spraying and dipping, depending on whether the composition according to the invention is used as powder, paste or liquid formulation [see above]. It is preferred that per m$^2$ of surface area 1–40 grames of the components (a+b+c) should be applied to the surface. It should be noted that, although in most instances the composition according to the invention will be applied to the surface of a polymer mixture that has already been shaped, in several instances it is also possible to treat a polymer mixture with said composition prior to or during the shaping step.

Finally, the cross-linking is carried out with the appropriate equipment under the usual conditions. Typically, the cross-linking is carried out at elevated temperature (e.g. 150°–220° C.) and/or under the influence of radiation (e.g. UHF or IR radiation).

It has been found that the process of the invention is particularly useful when a cross-linked polymer containing a high proportion (up to 80% by weight of the polymer mixture) of extender oil is desired.

As examples of shaped objects that may be prepared by the process according to the invention may be mentioned tubes, wiper blades and sealing rubbers.

The invention is further described in the following examples.

EXAMPLE 1

A polymer mixture to be cross-linked was prepared by mixing the constituents, without the peroxide, in a Banbury mixer and incorporating the peroxide into the resulting basic mixture by means of a two-roll mill. The polymer mixture was composed as follows:

100 parts of EPDM rubber (Keltan ® 578, a commercial product of DSM),
70 parts of SRF black N-762,
70 parts of FEF black N-550,
70 parts of extender oil (Sunpar ® 150, a commercial product of Sun Oil Company),
0.5 parts of stearic acid and
7.6 parts of 1,1-di(t-butylperoxy)-3,3,5-trimethylcyclohexane.

Of this mixture 2 mm thick test strips were cut which were compressed between Mylar film for 10 minutes at 50°. Subsequently, five test strips were subjected to a treatment with a composition according to the invention as follows:

Experiment 1A:
dipping in a liquid formuation containing
7.5% by weight of polyethylene powder (LDPE, melt flow index: 70 g/10 min., particle size 5–7 microns (Coathylene ® HA 1681, a commercial product of Plast Labor, Switzerland);
5% by weight of calcinated silanized clay powder (Devolite ® clay, a commercial product of Mosam, Netherlands);
10% by weight of 0,0-t-butyl O-stearyl monoperoxycarbonate;
5% by weight of N,N'-m-phenylene dimaleimide;
1% by weight of ethoxylated (7EO) nonyl phenol;
0.1% by weight of xanthan gum, and
71.4% by weight of water.

Experiment 1B:
analogous to Exp. 1A, except that the formulation 1:1 (v/v) was diluted with water.

Experiment 1C:
spraying with a formulation as described with Exp. 1A.

Experiment 1D:
spraying with a formulation as described with Exp. 1B.

Experiment 1E:
applying a powder consisting of:
27% by weight of polyethylene powder (Coathylene ® HA 1681);
18% by weight of calcinated, silanized clay powder (Devolite ® clay);
37% by weight of 0,0-t-butyl O-stearyl monoperoxycarbonate; and
18% by weight of N,N'-m-phenylene dimaleimide.

In all experiments care was taken that the amount of [polyethylene+clay+peroxide], calculated per m2 of surface area, applied to the surfaces of the test strips was between 1 and 40 grams.

The five test strips were subsequently cross-linked in a hotair oven (i.e. in the presence of air oxygen) for 30 minutes at 160° C. After the test strips had been kept at room temperature for 24 hours, the following properties were determined:

stickiness: This property was measured by using a Tel-Tak ® tester (ex Monsanto): Two rectangular test specimens were pressed together for a certain time and subsequently separated from each other at a rate of 2.54 cm/min. The force required to separate the test specimens is a measure of the stickiness: the smaller the force required, the less the stickiness of the surfaces. In the experiments the compression time was 2 min and the compression pressure 281 g/cm².

curing: This parameter is indicative of the degree of crosslinking of the material immediately below the surface. It was determined by scratching the surface with a pointed object, such as a pair of scissors, and assessing the exposed layer.

surface appearance: This was determined visually.

The results are given in Table 1, which also mentions the results for a test strip which had not undergone any treatment at all prior to cross-linking (Comparative Experiment 1F) and for a test strip which prior to cross-linking had been sprayed with the composition according to Example 2 of European Patent Application No. 0,025,591 Al, viz. a 6% by weight cobalt-containing solution of cobalt octoate in xylene (Comparative Experiment 1G).

TABLE 1

|  | Stickiness kg/cm² | Curing* | surface appearance |
|---|---|---|---|
| Exp. | | | |
| 1A | 0 | ++ | semi-silky |
| 1B | 0.007 | ++ | silky gloss |
| 1C | 0 | ++ | semi-silky |
| 1D | 0.007 | ++ | silky gloss |
| 1E | 0 | ++ | silky gloss |
| Comparative Exp. | | | |
| 1F | 0.582 | − − | high gloss |

TABLE 1-continued

|  | Stickiness kg/cm² | Curing* | surface appearance |
|---|---|---|---|
| 1G | 0.196 | − | silky gloss |

*++ = very good
− = poor
− − = very poor

These results clearly show the advantages obtained with the present invention.

EXAMPLE 2

In a similar way as described in Example 1 experiments were carried out in which prior to cross-linking the test strips were immersed in a composition according to the invention. Table 2 gives the compositions in the percentages by weight used. The clay powder used was calcinated, silanized clay powder.

TABLE 2

| Composition | A | B | C | D | E | F | G | H | I | J | K |
|---|---|---|---|---|---|---|---|---|---|---|---|
| Polyethylene powder (Coathylene ® HA 1681) | 10 | 10 | 10 | 10 | 10 | 10 | 10 | 1 | 3 | 5 | 10 |
| Clay powder (Devolite ® clay) | 5 | 5 | 5 | 5 | 5 | 5 | 5 | 5 | 5 | 5 | 5 |
| 1,1-Di(t-butylperoxy)-3,3,5-trimethyl-cyclohexane | 5 | 15 | 30 | | | | | | | | |
| O,O—t-butyl O—stearyl monoperoxycarbonate | | | | 10 | | | 10 | 10 | 10 | 10 | |
| Dicumyl peroxide | | | | | 10 | | | | | | |
| Bis(t-butylperoxy-isopropyl)benzene | | | | | | 5 | | | | | |
| Dibenzoyl peroxide | | | | | | | | | | | 10 |
| N,N'—m-phenylene dimaleimide | | | | | | | 5 | 5 | 5 | 5 | 5 |
| Ethoxylated (7EO) nonylphenol | 1 | 1 | 1 | 1 | 1 | 1 | 1 | 1 | 1 | 1 | 1 |
| Xanthan gum | 0.1 | 0.1 | 0.1 | 0.1 | 0.1 | 0.1 | 0.1 | 0.1 | 0.1 | 0.1 | 0.1 |
| Water | 78.9 | 68.9 | 53.9 | 73.9 | 73.9 | 78.9 | 68.9 | 77.9 | 75.9 | 73.9 | 68.9 |

The properties determined on the test strips after crosslinking are mentioned in Table 3. For Exp. 2A use was made of the composition A given in Table 2, for Exp. 2B the composition B given in Table 2, etc.

TABLE 3

| Exp. | Stickiness kg/cm² | Curing* | surface appearance |
|---|---|---|---|
| 2A | 0 | −+ | semi-silky |
| 2B | 0 | + | semi-silky |
| 2C | 0 | + | semi-silky |
| 2D | 0 | −+ | semi-silky |
| 2E | 0 | + | semi-silky |
| 2F | 0 | + | semi-silky |
| 2G | 0 | ++ | semi-silky |
| 2H | 0.168 | −+ | gloss |
| 2I | 0.014 | + | silky gloss |
| 2J | 0.014 | ++ | silky gloss |
| 2K | 0 | ++ | semi-silky |

*++ = very good
+ = good
−+ = moderate

EXAMPLE 3

The experiments described in Example 2 were repeated, except D that calcinated clay powder (Devolite ® clay) was used instead of calcinated, silanized clay powder (Devolite ® clay). The results obtained were identical with those mentioned in Table 3 above.

We claim:
1. A process for cross-linking a polymer with the aid of a radical forming cross-linking agent, said process comprising subjecting a mixture of the polymer, the cross-linking agent and optional additives to treatment with a composition suitable to prevent surface stickiness of the cross-linked end product, wherein said composition is comprised of:

(a) a solid, finely divided, film forming polymer having a particle size in the range of 1–100 microns, (b) finely divided rubber filler having a particle size in the range of 1–100 microns, and (c) an organic peroxide having a half-life period of decomposition of at least 15 minutes at 100° C.

the amounts of a, b and c being 5–75% by weight, 5–75% by weight and 5–70% by weight, respectively, calculated on the amount of (a+b+c), the amount of said composition used being such that components a, b and c of said composition are present on the surface of the mixture in an amount ranging from 1 to 40 grams of (a+b+c) per square meter of surface area;

and cross-linking the treated mixture.

2. A process according to claim 1, wherein the polymer is polyethylene and the filler calcinated clay, calcinated, silanized clay or a combination thereof.

3. A process according to claim 1, wherein the peroxide is O,O-t-butyl O-stearyl monoperoxycarbonate.

4. A process according to claim 1, wherein the composition also contains a co-agent selected from the group consisting of triallyl cyanurate, triallyl isocyanurate, triallyl phosphate, ethylene glycol dimethacrylate, trimethylolpropane trimethacrylate, divinyl benzene, diallyl maleinate and N,N'-m-phenylene dimaleimide.

5. A process according to claim 1, wherein the composition is in the form of a powder.

6. A process according to claim 1, wherein the composition contains a solvent and is in the form of paste or a liquid formulation.

7. A process according to claim 6, wherein the solvent is water.

* * * * *

UNITED STATES PATENT AND TRADEMARK OFFICE
CERTIFICATE OF CORRECTION

PATENT NO. : 4,808,442

DATED : February 28, 1989

INVENTOR(S) : Johannes P.J. Verlaan; Leonardus B.G.M. Nijhoe

It is certified that error appears in the above-identified patent and that said Letters Patent is hereby corrected as shown below:

Column 3, line 22, after "15" insert --minutes--.
Column 4, line 40, change "A" to -- As --.
Column 5, line 61, change "grames" to --grams--.
Column 6, line 37, change "formuation" to --formulation--.

Signed and Sealed this

Nineteenth Day of December, 1989

Attest:

JEFFREY M. SAMUELS

Attesting Officer     Acting Commissioner of Patents and Trademarks